US006687044B2

(12) United States Patent
Paquet et al.

(10) Patent No.: US 6,687,044 B2
(45) Date of Patent: Feb. 3, 2004

(54) CONNECTION DISCOVERY FOR OPTICAL AMPLIFIER SYSTEMS

(75) Inventors: Mario Paquet, Aylmer (CA); Marc Veilleux, Ottawa (CA)

(73) Assignee: Nortel Networks Limited, St-Laurent (CA)

( * ) Notice: Subject to any disclaimer, the term of this patent is extended or adjusted under 35 U.S.C. 154(b) by 69 days.

(21) Appl. No.: 10/022,355

(22) Filed: Dec. 20, 2001

(65) Prior Publication Data

US 2003/0117695 A1 Jun. 26, 2003

(51) Int. Cl.$^7$ .................................................. H01S 3/00
(52) U.S. Cl. ............................ 359/337; 398/9; 398/177
(58) Field of Search ................................ 359/110, 177, 359/337; 398/9, 177

(56) References Cited

U.S. PATENT DOCUMENTS 5,822,094 A  10/1998  O'Sullivan et al.
5,914,794 A  * 6/1999  Fee et al. .................... 359/110

* cited by examiner

Primary Examiner—Mark Hellner

(57) ABSTRACT

Control information is embedded in the signal passing through an optical amplifier by varying the power level of that amplifier's pumped laser source. Connection discovery for a given optical port can then be performed by detecting variations in the optical signal present on that given port and then attempting to match these with the variations assigned to each of the optical amplifiers. If a match is found, then the optical amplifier connected to the given port can be identified. As a result, the need to physically handle the fiber in order to effect connection discovery is eliminated, rendering the process faster, safer and more reliable. Also, the present invention advantageously allows a connection discovery function to be invoked from a remote location.

36 Claims, 6 Drawing Sheets

CONNECTION DISCOVERY FOR OPTICAL AMPLIFIER SYSTEMS

FIELD OF THE INVENTION

The present invention relates generally to connection discovery in optical networks and, more particularly, to a method and apparatus for determining the existence of connections established between a set of optical amplifiers and a processing device. The present invention also pertains to determining the existence of connections established between an optical amplifier and a mid-stage access (MSA) device.

BACKGROUND OF THE INVENTION

Optical devices such as spectrum analyzers, cross-connects, switches, dynamic gain flattening filters (DGFFs) and multiplexers are adapted to process optical signals received from various sources. In many cases, the optical signals are amplified by optical amplifiers prior to their arrival at the input ports of the device. The physical interconnection pattern between the optical amplifiers and the input ports of the device defines a "connection map". Accurate knowledge of the connection map is necessary for the processing device to successfully execute its intended function such as spectral analysis, switching, filtering or multiplexing.

Knowledge of the connection map can be gained by manually inspecting the connection existing between each amplifier and the processing device. However, this is a laborious process that is prone to human error and can result in hazardous exposure if a given optical link is severed and allows light to escape. Alternatively, all input ports except for a single remaining port can be disconnected from their respective amplifiers, and the processing device can proceed to learn the connectivity of the remaining input port. Specifically, a pilot signal can be inserted into the optical path of each amplifier sequentially, and an operator then looks for the presence of the pilot signal at the remaining input port. When the pilot signal is detected at the remaining input port in response to stimulating a given one of the amplifiers, the operator concludes that there is a connection between that amplifier and the remaining input port. This process is repeated for the next input port, and so on. As can be appreciated, this technique is time consuming and, furthermore, requires traffic flow to be interrupted during connection discovery.

Clearly, there is a need to provide a faster approach to connection discovery that does not require the interruption of traffic flow during the discovery process.

SUMMARY OF THE INVENTION

The present invention capitalizes on the fact that many optical amplifiers provide optical amplification using a "pumped" laser source. In different embodiments, this may be achieved by excitation of a rare earth element (e.g., erbium) or, in the case of stimulated Raman scattering, by injecting energy in the form of light into the fiber that carries the signal to be amplified. Regardless of the physical phenomena involved in amplification, control information is embedded in the signal passing through an optical amplifier by varying the power level of that amplifier's pumped laser source.

Connection discovery for a given optical port can then be performed by detecting variations in the optical signal present on that given port and then attempting to match these with the variations assigned to each of the optical amplifiers. If a match is found, then the optical amplifier connected to the given port can be identified. As a result, the need to physically handle the fiber in order to effect connection discovery is eliminated, rendering the process faster, safer and more reliable. Also, the present invention advantageously allows a connection discovery function to be invoked from a remote location.

Therefore, the invention may be summarized according to a first broad aspect as a method of discovering the existence of connections between at least one optical amplifier and at least one port, each optical amplifier being capable of optically amplifying an incoming traffic signal as a function of an intensity of an associated energy signal received from an energy source. The method includes varying the energy signal associated with each optical amplifier in accordance with a respective control signal and receiving an optical signal at each port in a subset of the at least one port. For each port in the subset, the method includes detecting each control signal present in the optical signal received at the port, each such control signal being a detected control signal for the port. Finally, for each port in the subset, the method includes determining the identity of each optical amplifier connected to the port on the basis of each detected control signal for the port and on the basis of the identity of the optical amplifier respectively associated with each detected control signal for the port.

According to a second broad aspect, the invention may be summarized as a connection discovery system for discovering the existence of connections between at least one optical amplifier and at least one port, each optical amplifier being capable of optically amplifying an incoming traffic signal as a function of an associated energy signal received from an energy source and being varied in accordance with a respective control signal. The system includes a receiver unit operable to receive an optical signal at each port in a subset of the at least one port. The system also includes a detection unit operable to detect, for each port in the subset, each control signal present in the optical signal received at the port, each such control signal being a detected control signal for the port.

Moreover, the system includes a controller operable to determine, for each port in the subset, the identity of each optical amplifier connected to the port on the basis of each detected control signal for the port and on the basis of the identity of the optical amplifier respectively associated with each detected control signal for the port.

The invention may be summarized according to a third broad aspect as a network element, including at least one optical amplifier capable of optically amplifying an incoming traffic signal as a function of an associated energy signal and at least one energy source. Each energy source is connected to a respective one of the at least one optical amplifier and is capable of generating the energy signal for the respective optical amplifier, each energy signal being variable in accordance with a respective control signal. The network element further contains a connection discovery system as described above.

According to a fourth broad aspect, the present invention may be summarized as a method of discovering the existence of connections between devices in an optical system. Each device is connected to respective input ports of a connection discovery system. Among the devices is included at least one optical amplifier capable of optically amplifying an incoming traffic signal as a function of an intensity of an associated energy signal received from an energy source. The method includes varying the energy signal associated with each optical amplifier in accordance with a respective control signal, receiving an optical signal at each port of the connection discovery system and searching for the presence of a control signal present in the optical signal received at each port. If the same control signal is present in the optical signal received at each port in a particular set of ports, it is concluded that the devices connected to the particular set of ports are connected to one another.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 1:
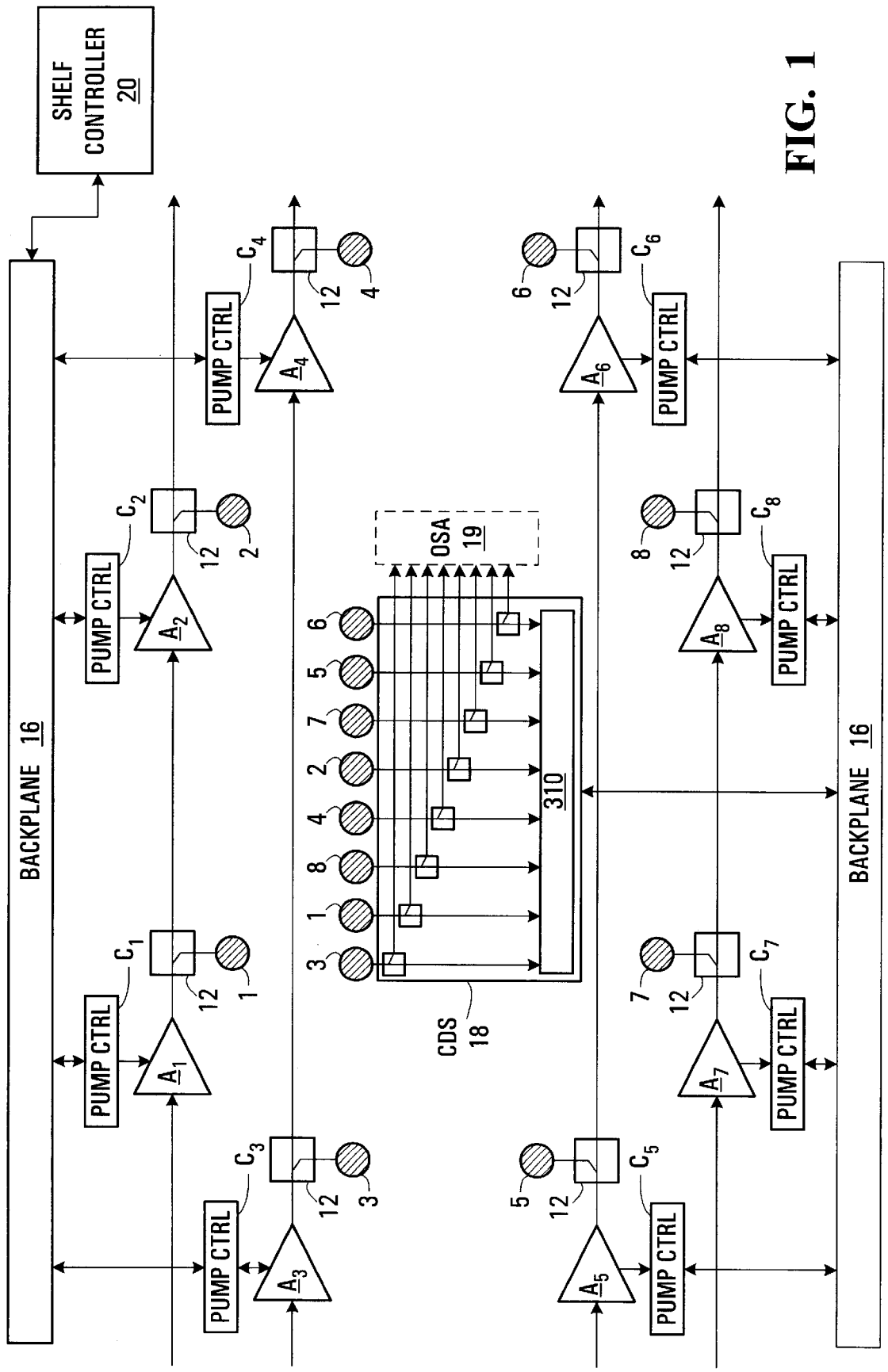
FIG. 1 shows, in schematic form, an arrangement of optical amplifiers connected to a multi-port device.

FIG. 1 shows an arrangement of optical amplifiers $A_i$, $1 \leq i \leq 8$, such as may be found at a large-scale amplification site or switching node in an optical network. Of course, the number of optical amplifiers illustrated in FIG. 1 is merely for the purposes of providing an example, the present invention being generally applicable to any number of optical amplifiers. Each of the optical amplifiers $A_i$ is designed to amplify an input optical signal in accordance with a gain. To this end, the optical amplifiers may be erbium-doped fiber amplifiers. The gain of a given optical amplifier is a function of the power or intensity of a pumped laser source (not shown) which is internal to that amplifier. The power of the pumped laser source in each of the optical amplifiers $A_i$ is controlled by a respective "dithered" pump control signal received from a respective one of a plurality of pump controllers $C_i$.

Each pump controller $C_i$ is adapted to be in bi-directional communication with a shelf controller 20 via a backplane 16, which may be common to two or more amplifiers. Each pump controller $C_i$ receives a "pump power level" via the backplane 16, which may also be used to permit the exchange of other parameters with the shelf controller 20. The pump power level received by pump controller $C_i$ is the power level to be applied by the pump laser source internal to the corresponding optical amplifier $A_i$. In one embodiment, the pump controller $C_i$ receives the pump power level via the backplane 16 in the form of a digital signal. Alternatively, the pump power level could be determined internally, i.e., the pump power level need not be received from the backplane 16. In such a scenario, the pump power level of the pump controller $C_i$ would not be managed by the shelf controller 20, in this way creating a closed loop within each amplifier for generation of the associated pump power level.

Figure 2:
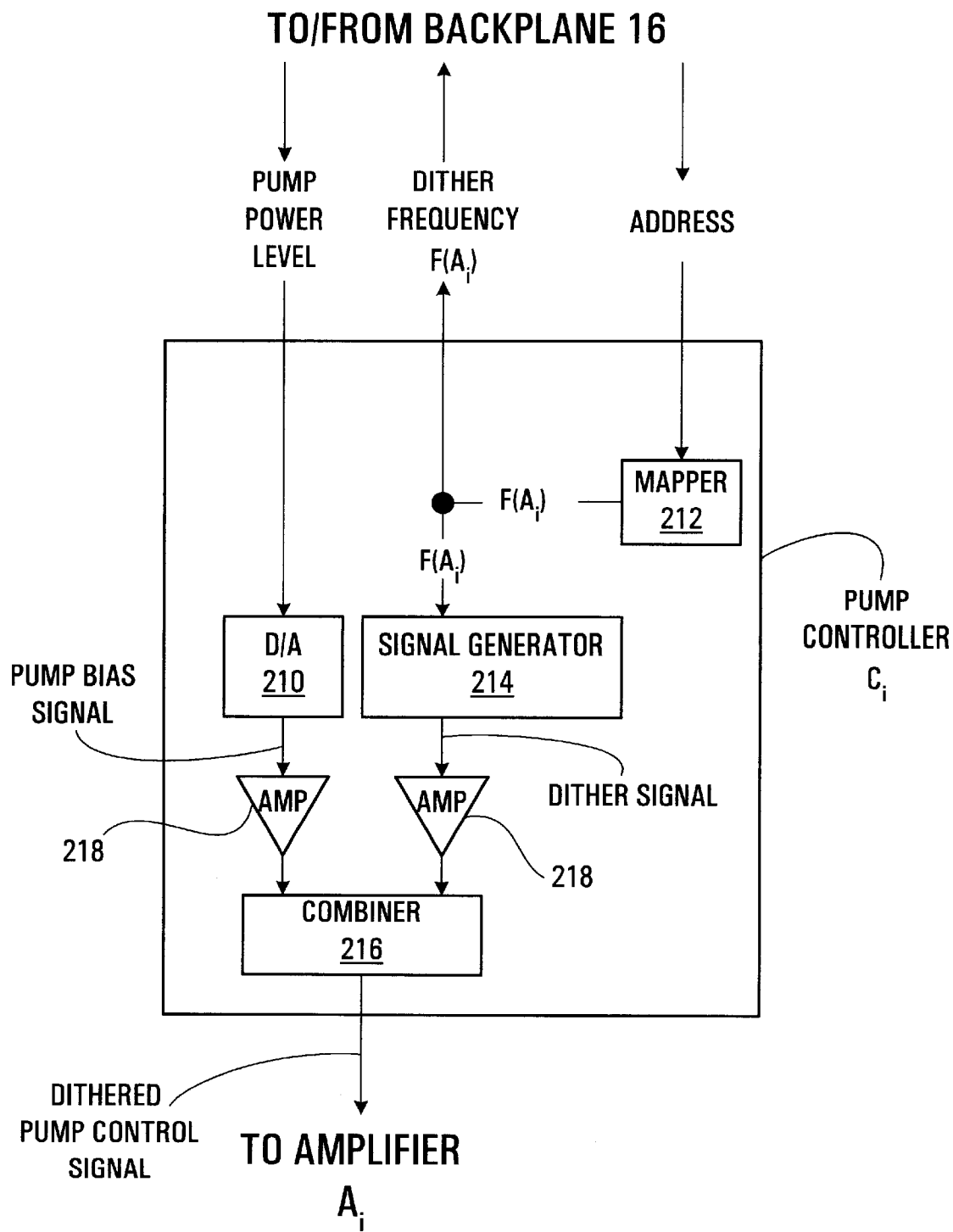
FIG. 2 shows, in schematic form, a pump controller used for varying the power of the pumped laser source of an optical amplifier in FIG. 1.

With reference to FIG. 2, showing a pump controller $C_i$ in schematic form, the pump power level is fed to a digital-to-analog (D/A) converter 210, which transforms the pump power level into a "pump bias signal" that is intended to be fed directly to the pumped laser source of the corresponding optical amplifier $A_i$. However, before actually being sent to optical amplifier $A_i$, the pump bias signal at the output of the D/A converter 210 is combined with a dither signal to create a dithered pump control signal. The term "dither signal" is meant to encompass any type of low-amplitude signal that is embedded onto an underlying signal for the purposes of conveying control information. Both analog and digital dither signals are within the scope of the present invention. It may be advantageous to keep the amplitude of the resultant dither signal relatively small compared to the amplitude of the pump bias signal output by the D/A converter 210, so as not to disturb the traffic travelling through optical amplifier $A_i$. The appropriate amplitude ratio can be achieved through the use of a pair of amplifiers 218.

The pump controller $C_i$ is operable to obtain knowledge of an "address" of the corresponding optical amplifier $A_i$. The address of optical amplifier $A_i$ may be determined by the optical amplifier itself according to its position with respect to the backplane 16, shelf, bay, node, etc. This self-recognition process can be performed in a variety of ways, any of which is known to those of ordinary skill in the art.

In the illustrated embodiment, the address of optical amplifier $A_i$ is fed to a mapper 212. The mapper 212, which may be embodied as a look-up table, is operable to determine a characteristic that is uniquely associated with the address of the amplifier $A_i$. Examples of suitable characteristics include a single frequency, a set of frequencies, an amplitude level, a phase, a series of signal level transitions, a digital code, a duty cycle, etc. To simplify the remainder of the description, but without intending to narrow the scope of the invention, it will be assumed that the characteristic is a single frequency, hereinafter referred to as the dither frequency. Therefore, the mapper 212 located in the pump controller $C_i$ of each of the various amplifiers $A_i$ will produce a unique dither frequency. For notational convenience, the dither frequency uniquely associated with amplifier $A_i$ will hereinafter be denoted $F(A_i)$.

In the illustrated embodiment, the dither frequency $F(A_i)$ is communicated by the mapper 212 in two ways. Firstly, it is made available through the backplane 16 to other node components which require it, such as the shelf controller 20 and a connection discovery system (CDS) 18, to be described later on in greater detail. Secondly, the dither frequency $F(A_i)$ is fed to a signal generator 214 within the pump controller $C_i$, in response to which the signal generator 214 generates the dither signal at the dither frequency $F(A_i)$.

In an alternative embodiment, rather than use a mapper 212 to perform the address-to-dither-frequency mapping internally, the pump controller $C_i$ may provide the address of the optical amplifier $A_i$ to the shelf controller 20. The shelf controller 20 is then responsible for performing the operation of mapping the address of the optical amplifier into a dither frequency or other suitable characteristic. In the absence of a mapper 212 in each of the pump controllers $C_i$, the shelf controller 20 can be used to supply the characteristic (e.g., dither frequency) associated with each optical amplifier $A_i$ to the connection discovery system (CDS) 18.

Continuing with the description of FIG. 2, a combiner 216 is used to combine the pump bias signal (as output by the digital-to-analog converter 210 via one of the amplifiers 218) with the dither signal (as output by the signal generator 214 via another one of the amplifiers 218), resulting in a dithered pump control signal. By "combining", it is meant that the output of the digital-to-analog converter 210 may be added, multiplied, modulated or otherwise combined with the output of the signal generator 214.

It is recalled that the signal at the output of the signal generator 214 is at a dither frequency $F(A_i)$ which is uniquely associated with optical amplifier $A_i$. Hence, the dithered pump control signal that feeds the pumped laser source of optical amplifier $A_i$ will contain a component exhibiting the unique frequency $F(A_i)$. Furthermore, as a result of the pump energy transfer process that takes place in optical amplifier $A_i$, the unique dither frequency $F(A_i)$ will appear in the optical signal at the output of optical amplifier $A_i$. Thus, unique control information can be embedded in the optical signal passing through optical amplifier $A_i$ by varying the intensity of that amplifier's pumped laser source.

In the embodiment shown in FIG. 1, the output of each optical amplifier $A_i$ passes through a respective one of a plurality of optical splitters 12. Each splitter 12 diverts a portion of the optical power received from the corresponding optical amplifier towards a combination of a processing device 19 and a connection discovery system (CDS) 18. The remainder of the optical power, not tapped by the splitter 12, continues along a main optical path, which may lead to another optical amplifier or other downstream components in the optical network.

Figure 3:
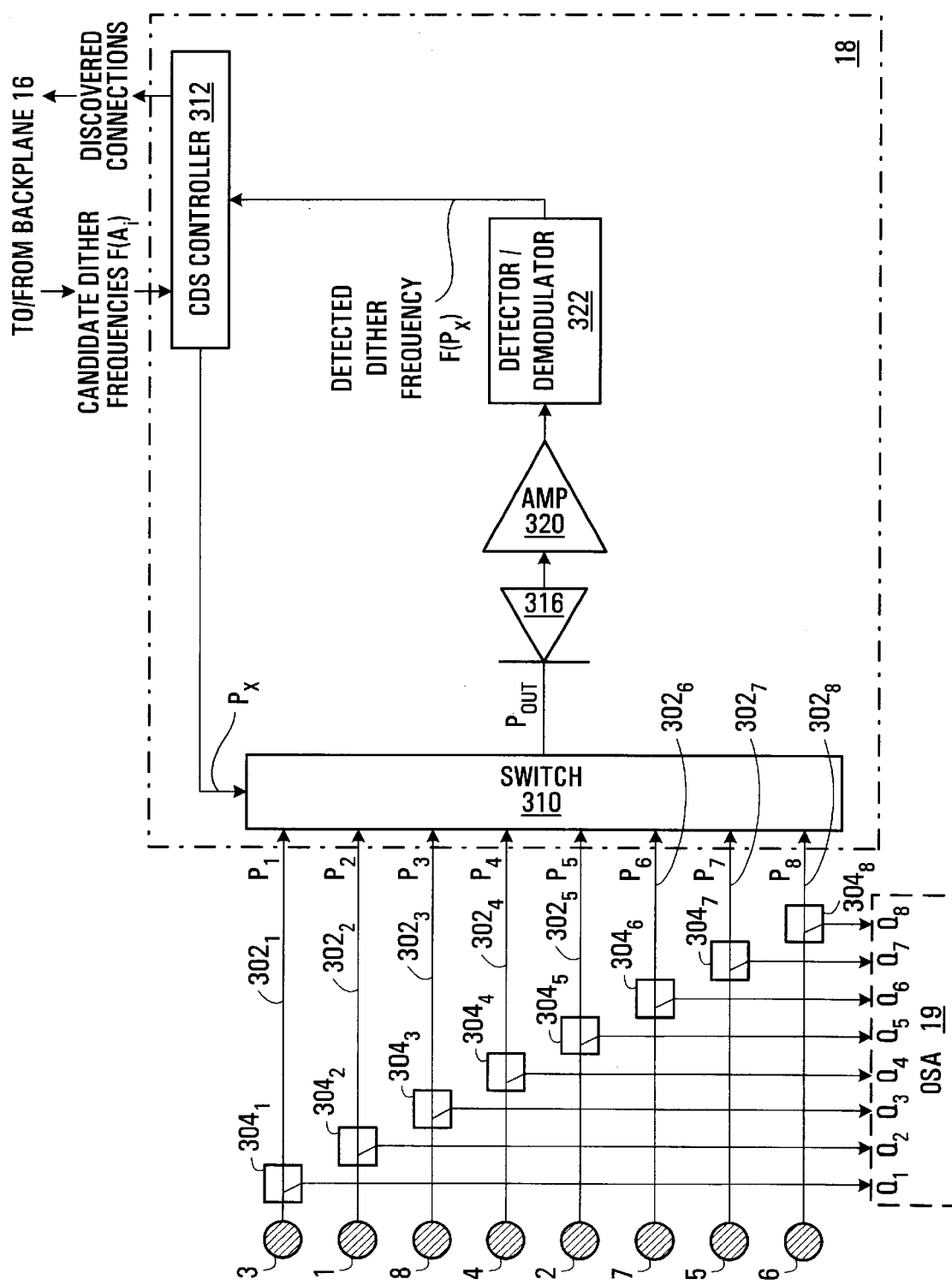
FIG. 3 shows, in schematic form, a connection discovery system in accordance with an embodiment of the present invention.

The connection discovery system (CDS) 18, now described with reference to FIG. 3, includes an optical link $302_j$ from each of the amplifiers, although the identity of the amplifier to which optical link $302_j$ is connected is not known and needs to be "discovered" by the CDS 18. Each of the optical links $302_j$ passes through a respective optical splitter $304_j$ which diverts a portion of the optical power of the optical signal on optical fink $302_j$ towards a respective input port $P_j$ of a switch 310 and the rest of the optical power to a respective input port $Q_j$ of the processing device 19. The processing device 19 is suitably a multi-port device such as an optical spectrum analyzer (OSA) or other multiport device. Of course, depending on the application, connectivity to a multiport device may differ from that shown in FIGS. 1 and 3.

The switch 310 has a plurality of input ports $P_j$, $1<j<8$, one for each of the optical amplifiers $A_i$. An interconnection exists between the optical amplifiers $A_i$ and the input ports $P_j$ of the switch 310 and needs to be discovered. With reference to the illustrated embodiment, $P_1$ is connected to optical amplifier $A_3$, port $P_2$ is connected to optical amplifier $A_1$, port $P_3$ is connected to optical amplifier $A_8$, port $P_4$ is connected to optical amplifier $A_4$, port $P_5$ is connected to optical amplifier $A_2$, port $P_6$ is connected to optical amplifier $A_7$, port $P_7$ is connected to and optical amplifier $A_5$, and port $P_8$ is connected to optical amplifier $A_6$. These connections are unknown and need to be discovered by the CDS 18.

The optical switch 310 may suitably be implemented as a micro-electro-mechanical switch (MEMS) comprising a column of mirrors, with one of the mirrors corresponding to each of the input ports. A selected one of the mirrors is raised under control of a control signal received from a CDS controller 312. The control signal identifies a selected one of the input ports. The selected mirror, corresponding to the selected port, reflects light from selected input port towards an output port $P_{OUT}$ of the switch 310. The selected input port will hereinafter be denoted $P_X$.

In this specific embodiment, the output port $P_{OUT}$ of the switch 310 is connected to an opto-electronic converter 316. The opto-electronic converter 316 may be a PIN photodiode, for example, which produces an electronic version of the optical signal received from the output port $P_{OUT}$ of the optical switch 310. Thus, if the optical signal at the output port $P_{OUT}$ of the optical switch 310 contains a component that exhibits a particular dither frequency, this dither frequency will also manifest itself in the electronic signal at the output of the opto-electronic converter 316. The same applies to dither signals characterized by multiple frequencies or having characteristics other than frequency.

The signal at the output of the opto-electronic converter 316 is fed to an amplifier 320, which is not required but may be used to boost the level of the electronic signal. The output of the amplifier 320 is connected to a detector/demodulator 322, which comprises circuitry, software and/or control logic for detecting the presence of a dither frequency in the optical signal received from the amplifier 320. This will correspond to the dither frequency in the optical signal entering the switch 310 via the selected input port $P_X$ and therefore can be denoted $F(P_X)$).

By way of example, the detector/demodulator 322 may be implemented as a frequency detector or decoder. In another embodiment, the detector/demodulator 322 may be implemented as a bank of correlators which performs multiple correlations against various candidate dither frequencies in order to determine the one dither frequency $F(P_X)$ that is the most prevalent in the optical signal arriving at port $P_X$ currently being selected by the CDS controller 312.

The detector/demodulator 322 sends the detected dither frequency $F(P_X)$ to the CDS controller 312, which is equipped with software, circuitry and/or control logic for executing comparison operations as part of a connection discovery algorithm. Advantageously, the present invention uses the connection discovery system (CDS) 18 to discover the connections existing between the optical amplifiers and the ports of the switch 310 without actually having to handle any of the fiber optic links. To achieve this, the power level of each amplifier's pumped laser source needs to be varied during the discovery process so as to embed control information into the signal passing through the optical amplifiers $A_i$ in the manner described herein above with reference to FIG. 2.

Figure 4:
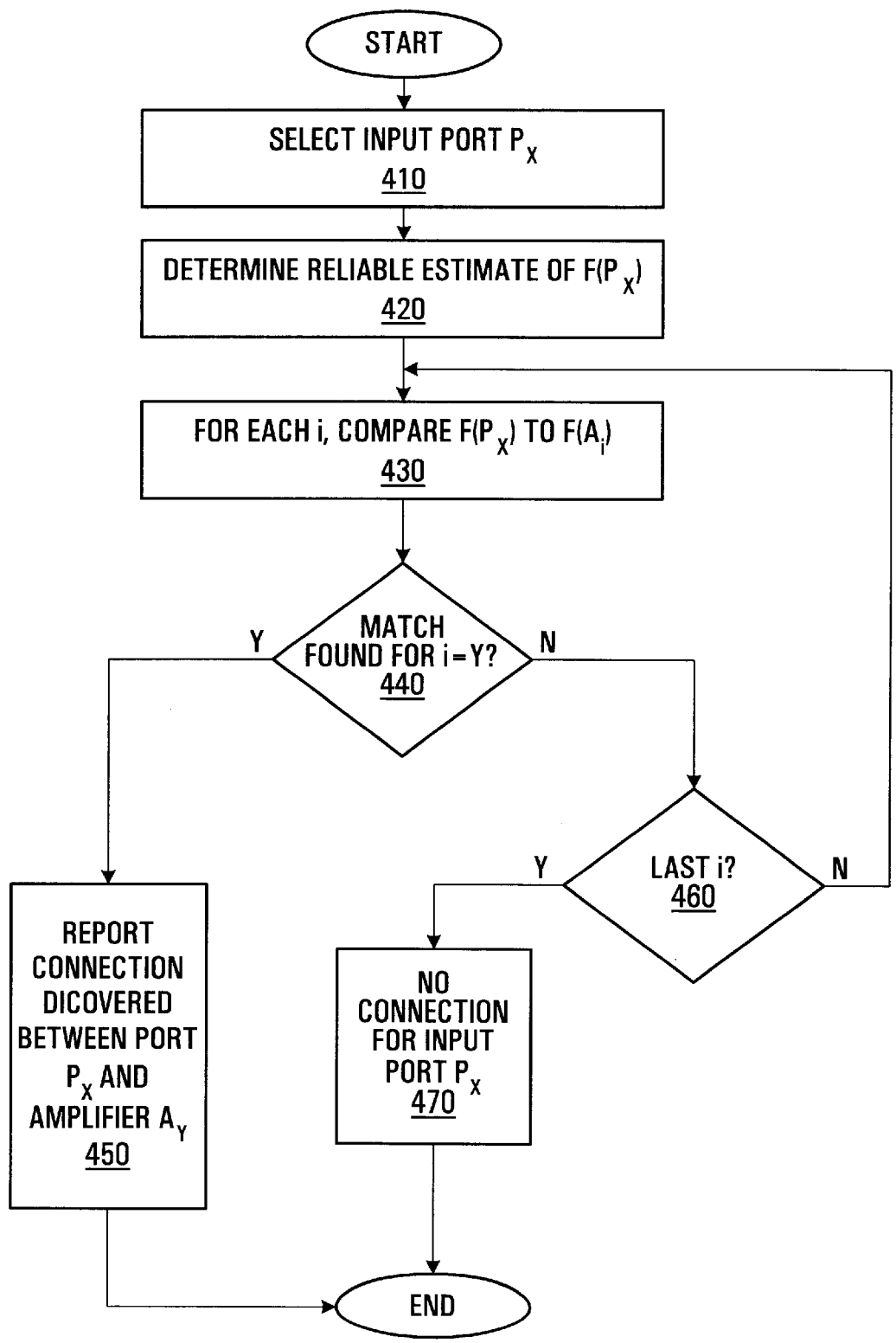
FIG. 4 is a flowchart illustrating the operational steps in a connection discovery algorithm executed by a controller in the connection discovery system of FIG. 3.

The main operational steps in the connection discovery algorithm are now described in greater detail with reference to the flowchart in FIG. 4. At step 410, the CDS controller 312 selects one of the input ports of the optical switch, say input port $P_X$, for X=1. The optical signal emerging at the output port $P_{OUT}$ of the switch 310 contains a component at the dither frequency $F(P_X)$. The detector/demodulator 322 receives this signal and waits until the signal has "settled". This may take anywhere from a few micro-seconds to a few milliseconds, depending on the allowable frequency range of the dither signal.

At step 420, the detector/demodulator 322 determines a reliable estimate of the dither frequency $F(P_X)$ contained in the received signal and provides this estimate to the CDS controller 312. At step 430, the CDS controller 312 compares the dither frequency $F(P_X)$ received from the detector/demodulator 322 with the dither frequencies $F(A_i)$ associated with the various amplifiers $A_i$. It is recalled that the dither frequency associated with a given optical amplifier may be provided to the shelf controller 20 by the mapper 212 in that amplifier. Alternatively, each amplifier $A_i$ may provide its address to the shelf controller 20, which then takes care of mapping the address to a dither frequency $F(A_i)$. In any event, the various possible dither frequencies are provided to the CDS controller 312 by the shelf controller 20. Thus, the CDS controller 312 is in fact comparing the dither frequency carried by the signal received at input port $P_x$ with the frequency of the dither signal used to vary the intensity of the pumped laser source of each optical amplifier $A_i$.

At step 440, the CDS controller looks for a "match" between $F(P_X)$ and one of the possible dither frequencies, say, $F(A_Y)$. What constitutes a "match" depends on the nature of the unique characteristic of the dither signal. In the case where the characteristic is a single dither frequency, then it may be appropriate to declare a match when a difference of several Hz exists between the two quantities being compared. Naturally, the required degree of proximity before declaring that a match has been obtained will also depend on the separation between neighbouring frequencies assigned to different optical amplifiers. In an alternative embodiment where the characteristic is a unique digital code associated with each optical amplifier, a match may be declared when the bit error ratio is below a predetermined threshold. In general, skilled practitioners will appreciate that different standards may apply to different characteristics being evaluated.

If a match is found, then the CDS controller 312 concludes that optical amplifier $A_Y$ is connected to input port $Q_X$ of the optical processing device 19. The connection can be said to have been "discovered" and, at step 450, this fact is reported to an external entity. However, if there is no match, then, at step 460, the CDS controller 312 looks for a "match" between $F(P_X)$ and the next possible dither frequency. If not a single dither frequency is found to correspond to $F(P_X)$, then, at step 470, the CDS controller 312 concludes that none of the optical amplifiers $A_i$ is connected to input port $Q_X$ of the optical processing device 19.

The above process is repeated for each input port of the switch 310 (i.e., for a different value of X) until all existing connections have been discovered. It should be noted that the absence of a match indicates that no amplifier is connected to the selected input port $P_X$ of the switch and therefore that no amplifier is connected to port $Q_X$ of the optical processing device 19.

From the above, it can be seen that the present invention eliminates the need to physically handle the fiber to effect connection discovery, rendering the discovery process faster, safer and more reliable. Also, this advantageously allows a connection discovery function to be invoked from a remote location. This can be achieved by providing a separate control link from an external entity to the CDS controller 312 such that the results of connection discovery may be to the external entity.

It should be appreciated that many variations of the above described embodiments are possible. For example, it is within the scope of the invention to replace the optical switch 310 with one that has two (or more) output ports, so that two input ports $P_{X1}$ and $P_{X2}$ may be monitored at the same time. This would require a like number of opto-electronic converters 316 and amplifiers 320.

In another alternative design, the comparison between $F(P_X)$ and each of the dither frequencies used by the various amplifiers $A_i$ can be effected as a set of correlation operations within the detector/demodulator 322. The maximum correlation result would point to the amplifier whose associated dither frequency is most likely the dither frequency present in the signal at input port $P_X$ of the switch 310.

In another alternative embodiment of the present invention, the optical switch 310 and opto-electronic converter 316 could be replaced by an electrical switch preceded by a bank of opto-electronic converters. The electrical switch may be controlled in a manner similar to the way in which the optical switch 310 is controlled. The output of the electrical switch may be fed to a single detector/demodulator, which can be identical to the detector/demodulator 322 in FIG. 3. In this way, although there would be a net increase in the number of components used to implement connection discovery functionality in the CDS 18, there would also be a potential reduction in the switching cost, since it would be performed in the electrical domain rather than in the optical domain.

A further variant of the embodiment described immediately above involves eliminating the single detector/demodulator 322 and inserting a bank of detectors/demodulators between the bank of opto-electronic converters and the electrical switch. Although this represents a further increase in the total amount of hardware in the CDS 18, it would advantageously eliminate any "settling" time required between selection of a next input port of the optical switch 310 and the moment at which the output of a detector/demodulator becomes reliable.

It should also be understood that the present invention is not limited to erbium- (or rare-earth-) doped fiber amplifiers. Other types of optical amplifier configurations requiring an energy source for amplification purposes are within the scope of the invention. For example, the energy source is not restricted to a pumped laser and encompasses other energy sources such as a voltage or current source.

It should further be understood that instead of selecting the input port first, and then performing detection of the control signal present in the optical signal received at that input port, it is within the scope of the invention to embed a control signal in the output of only one of the optical amplifiers at a time, and to select each input port in turn until it is discovered that the control signal is present at the selected input port.

Figure 5:
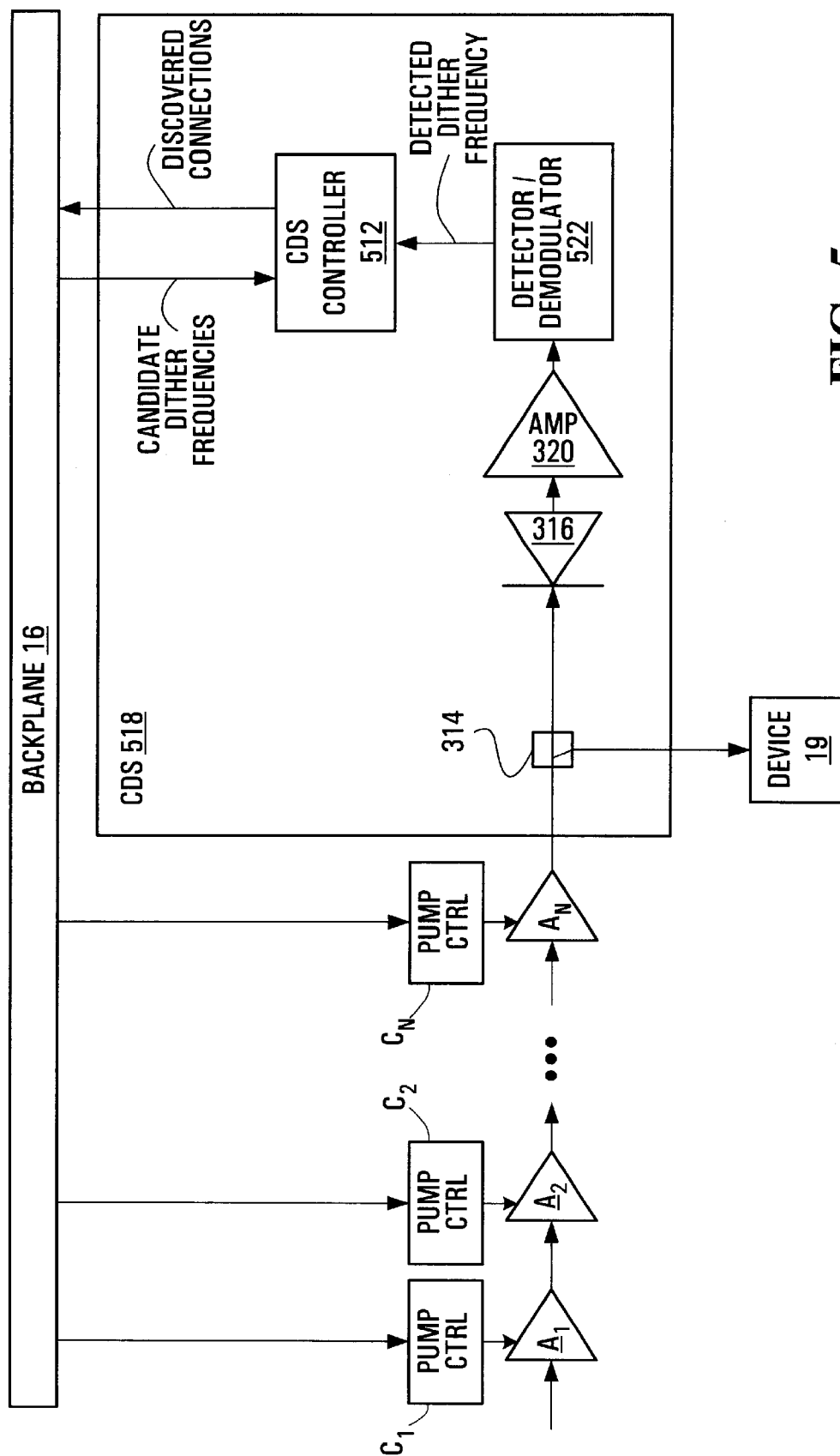
FIG. 5 shows, in schematic form, a connection discovery system in accordance with an alternative embodiment of the present invention.

It should also be appreciated that the present invention can be applied to the case where several optical amplifiers are cascaded prior to entering an input port of the processing device. In such a case, it may be desirable to determine the identity of the amplifiers connected in this fashion. To this end, FIG. 5 illustrates the situation where N amplifiers $A_1$, $A_2$, . . . , $A_N$ are connected to an input port of a device 19. The optical amplifiers $A_1$, $A_2$, . . . , $A_N$ each produce an output signal whose amplitude is controlled by a respective pump controller $C_1$, $C_2$, . . . , $C_N$ in the above described manner. The optical path at the output of the $N^{th}$ amplifier $A_N$ is intercepted by a splitter 314, which leads to a connection discovery system (CDS) 518.

The connection discovery system (CDS) 518 includes an opto-electronic converter 316, an optional amplifier 320, a detector/demodulator 522 and a CDS controller 512. The opto-electronic converter and the amplifier 320 components have been previously described with reference to FIG. 3. It is noted that no switching element is necessary in this embodiment because the amplifiers are connected in series to a single input port. However, it should be understood that a switching element may be used when there are multiple input ports and each input port accepts a signal having passed through a series of optical amplifiers.

The detector/demodulator 522 is adapted to perform multiple detection functions in parallel in order to determine the presence of multiple control signals in the signal arriving from the splitter 314. This results in the detection of a set of detected control signals, which are fed to the CDS controller 512. The controller 512 is much like the CDS controller 312 of FIG. 3, without the need to control operation of a switching element. Also, the CDS controller 512 performs a comparison operation for each detected control signal with the control signal associated with each of the amplifiers in order to determine which of the control signals are in the received optical signal. Thus, the CDS controller 512 can determine which of the amplifiers are connected in series to one another.

Those skilled in the art should appreciate that use of the control signals can be limited to the period during which connection discovery is needed. Specifically, it is within the scope of the present invention to control the pump controllers $C_i$ so that the control signals are applied just before beginning the connection discovery process, and to stop applying the control signals once connection discovery is complete.

It should also be appreciated by those skilled in the art that the present invention may be applied to signals that are tapped at the output ports of a device through which the signals have passed. That is to say, wherever the above description discusses selection of an input port, it is equally within the scope of the invention to perform selection of an output port and to process the optical signal exiting via the selected the output port.

A further embodiment of the present invention pertains to connection discovery in an optical amplifier system composed of a cascade of several optical amplifiers and mid-stage access (MSA) devices. Examples of a MSA device include a Dispersion Compensation Module (DCM) and an Optical Add Drop Multiplexer (OADM). In such a case, it may be desirable to determine the identity of the amplifiers connected in this fashion, as well as the identity of the amplifier(s) connected to the MSA device.

Figure 6:
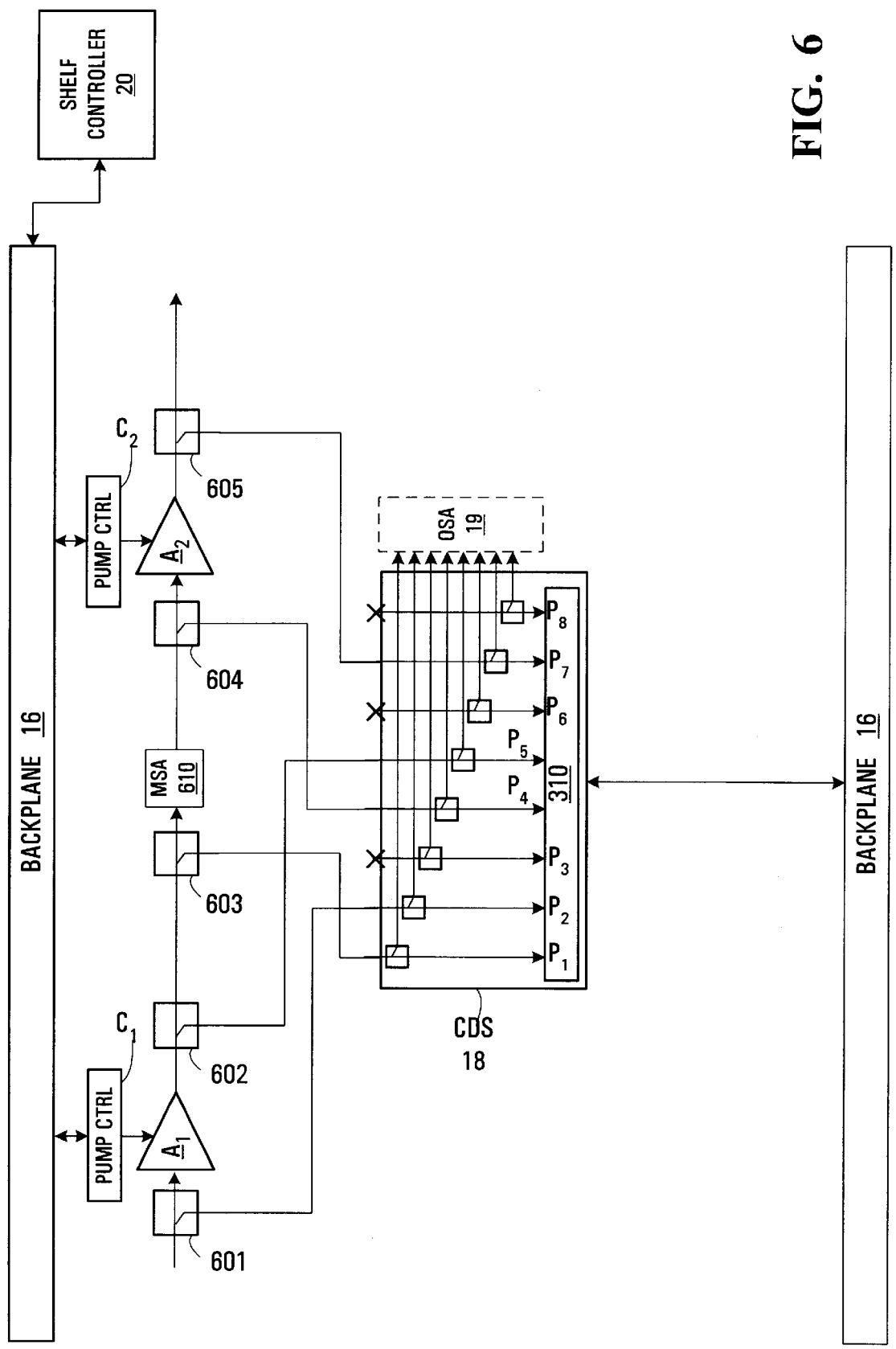
FIG. 6 shows, in schematic form, an arrangement of an optical amplifier system with a Mid-Stage Access (MSA) device connected to a multi-port device.

To this end, FIG. 6 illustrates the situation where amplifier $A_1$ is connected to a Mid-Stage-Access (MSA) device 610 that is connected to another amplifier $A_2$. The optical amplifiers $A_1$ and $A_2$ each produce an output signal whose amplitude is controlled by a respective pump controller $C_1$ and $C_2$ in the above described manner. The MSA device 610 is typically a device that does not produce any amplification and thus does not have a pump controller such that no dither can be added to the signal passing through it.

The input and output of each optical amplifier $A_i$, as well as the input of the MSA device 610, passes through a respective one of a plurality of optical splitters 601–605. Specifically, in FIG. 6, the input of optical amplifier $A_1$ passes through splitter 601, the output of optical amplifier $A_1$ passes through splitter 602, the input of the MSA device passes through splitter 603, the input of optical amplifier $A_2$ passes through splitter 604 and the output of optical amplifier $A_2$ passes through splitter 605. It should be understood that in some embodiments, it is the output of the MSA device 610 that would pass through an optical splitter. In still other embodiments, both the input and the output of the MSA device 610 may pass through respective optical splitters.

Each splitter diverts a portion of the optical power received from the corresponding optical amplifier or MSA device towards a combination of a processing device 19 and a connection discovery system (CDS) 18. As previously described, the CDS 18 has a plurality of input ports $P_1$–$P_8$.

In the illustrated embodiment, splitter 601 is connected to input port $P_2$, splitter 602 is connected to input port $P_5$, splitter 603 is connected to input port $P_1$, splitter 604 is connected to input port $P_4$ and splitter 605 is connected to input port $P_7$.

Of interest in this particular case is discovering the connectivity between amplifier $A_1$, the MSA device 610 and amplifier $A_2$. To this end, the connection discovery system CDS 18 detects the presence of a dither frequency at each of its input ports in the previously described manner, while application of a dither frequency by each amplifier is controlled via the amplifier's pump controller. In this case, for instance, the CDS 18 detects frequencies $F(P_1)$, $F(P_2)$, $F(P_4)$, $F(P_5)$ and $F(P_7)$. This may be done as amplifiers $A_1$ and $A_2$ are sequentially controlled to apply frquencies $F(A_1)$ and $F(A_2)$, respectively.

Next, the CDS 18 compares each of the detected frequencies against frequencies $F(A_1)$ and $F(A_2)$. Thus, the CDS 18 determines that neither $F(A_1)$ nor $F(A_2)$ is present at port $P_2$. The CDS 18 would also determine that $F(A_1)$ is present at ports $P_5$, $P_1$ and $P_4$. Finally, the CDS 18 would determine that $F(A_2)$ is present at port $P_7$. By observing that the dither present at port $P_5$ of CDS 18 is the same as the dither present at port $P_1$ and that present at port $P_4$, but different from the dither present at ports $P_2$ and $P_5$, one can conclude that the devices connected to ports $P_5$, $P_1$, and $P_4$ are interconnected.

Furthermore, by monitoring the amplitude (level) of the dither signal, it is possible to learn that the device connected at port $P_5$ is amplifier $A_1$, the device connected to port $P_1$ is MSA device 610 and the device connected to port $P_4$ is amplifier $A_2$. This knowledge, coupled with the knowledge that the devices connected to ports $P_5$, $P_1$, and $P_4$ are interconnected, allows one to conclude that amplifier $A_1$ is connected to amplifier $A_2$ via the MSA device 610.

Those skilled in the art should further appreciate that in some embodiments of the invention, all or part of the functionality previously described herein with respect to the CDS controller 312 may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the CDS controller 312 may be implemented as software consisting of a series of instructions for execution by a computer system. The series of instructions could be stored on a medium which is fixed, tangible and readable directly by the computer system, (e.g., removable diskette, CD-ROM, ROM, or fixed disk), or the instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the series of instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

We claim:

1. A method of discovering the existence of connections between at least one optical amplifier and at least one port of a device other than the at least one optical amplifier, each optical amplifier being capable of optically amplifying an incoming traffic signal as a function of an intensity of an associated energy signal received from an energy source, the method comprising:

varying the energy signal associated with each optical amplifier in accordance with a respective control signal;

receiving an optical signal at each port in a subset of the at least one port;

for each port in the subset, detecting each control signal present in the optical signal received at said port, each such control signal being a detected control signal for said port; and for each port in the subset, determining the identity of each optical amplifier connected to said port on the basis of each detected control signal for said port and on the basis of the identity of the optical amplifier respectively associated with each detected control signal for said port.

2. A method as defined in claim 1, further comprising selecting each port forming the subset of the at least one port.

3. A method as defined in claim 1, wherein varying the energy signal associated with each optical amplifier includes varying a pump power level associated with each optical amplifier.

4. A method as defined in claim 1, wherein varying the energy signal associated with each optical amplifier includes varying a source of stimulated Raman scattering associated with each optical amplifier.

5. A method as defined in claim 1, further comprising converting the optical signal at each port in the subset into an electrical signal.

6. A method as defined in claim 5, further comprising amplifying the electrical signal prior to the step of detecting.

7. A method as defined in claim 1, wherein each control signal has at least one unique characteristic selected from the group consisting of: a frequency, a set of frequencies, an amplitude, a series of signal level transitions, a phase and a modulated digital code.

8. A method as defined in claim 1, wherein detecting a control signal present in the optical signal received at a particular port includes performing a correlation operation with respect to each control signal and selecting, as the detected control signal for the particular port, the one control signal leading to a maximum correlation value.

9. A method as defined in claim 1, wherein each control signal is characterized by a respective frequency and wherein detecting the presence of a control signal in the optical signal received at a particular port includes detecting a frequency in the optical signal received at the particular port, comparing the detected frequency with the frequency that characterizes each control signal and selecting, as the detected control signal for the particular port, the one control signal whose frequency most closely resembles the detected frequency.

10. A method as defined in claim 1, wherein each control signal is characterized by a respective set of frequencies and wherein detecting the presence of a control signal in the optical signal received at the particular port includes detecting a set of frequencies in the optical signal received at the particular port, comparing the detected set of frequencies with the set of frequencies that characterizes each control signal and selecting, as the detected control signal for the particular port, the one control signal whose set of frequencies most closely resembles the detected set of frequencies.

11. A method as defined in claim 1, wherein each control signal is characterized by a respective amplitude and wherein detecting the presence of a control signal in the optical signal received at the particular port includes detecting an amplitude in the optical signal received at the particular port, comparing the detected amplitude with the amplitude that characterizes each control signal and selecting, as the detected control signal for the particular port, the one control signal whose amplitude most closely resembles the detected amplitude.

12. A method as defined in claim 1, wherein each control signal is characterized by a respective series of signal level transitions and wherein detecting the presence of a control signal in the optical signal received at the particular port includes detecting a series of signal level transitions in the optical signal received at the particular port, comparing the detected series of signal level transitions with the series of signal level transitions that characterizes each control signal and selecting, as the detected control signal for the particular port, the one control signal whose series of signal level transitions most closely resembles the detected series of signal level transitions.

13. A method as defined in claim 1, wherein each control signal is characterized by a respective phase and wherein detecting the presence of a control signal in the optical signal received at the particular port includes detecting a phase in the optical signal received at the particular port, comparing the detected phase with the phase that characterizes each control signal and selecting, as the detected control signal for the particular port, the one control signal whose phase most closely resembles the detected phase.

14. A method as defined in claim 1, wherein each control signal is characterized by a respective digital code and wherein detecting the presence of a control signal in the optical signal received at the particular port includes detecting a digital code in the optical signal received at the particular port, comparing the detected digital code with the digital code that characterizes each control signal and selecting, as the detected control signal for the particular port, the one control signal whose digital code most closely resembles the detected digital code.

15. A method as defined in claim 1, the port being an input port.

16. A method as defined in claim 1, the port being an output port.

17. A connection discovery system for discovering the existence of connections between at least one optical amplifier and at least one port of a device other than the at least one optical amplifier, each optical amplifier being capable of optically amplifying an incoming traffic signal as a function of an associated energy signal received from an energy source and being varied in accordance with a respective control signal, the system comprising:

a receiver unit operable to receive an optical signal at each port in a subset of the at least one port;

a detection unit operable to detect, for each port in the subset, each control signal present in the optical signal received at said port, each such control signal being a detected control signal for said port; and a controller operable to determine, for each port in the subset the identity of each optical amplifier connected to said port on the basis of each detected control signal for said port and on the basis of the identity of the optical amplifier respectively associated with each detected control signal for said port.

18. A system as defined in claim 17, the ports being first ports, wherein the receiver unit comprises a switch element having a plurality of input ports corresponding to the first ports, an output port connected to the detector and a control port connected to the controller, wherein the controller is adapted to selectively choose which input port of the switch element is connected to the output port of the switch element.

19. A system as defined in claim 18, wherein the switch is an optical switch, the system further comprising an opto-electronic converter connected between the output port of the switch and the detector.

20. A system as defined in claim 18, further comprising an amplifier connected between the opto-electronic converter and the detector.

21. A system as defined in claim 18, wherein the switch is an electrical switch and wherein the system further comprises a bank of opto-electronic converters connected to the input ports of the switch.

22. A system as defined in claim 17, wherein the controller is adapted to be controllable from a location remote to the system.

23. A system as defined in claim 17, further comprising an amplifier connected between the receiver unit and the detection unit.

24. A system as defined in claim 17, wherein each control signal has at least one unique characteristic selected from the group consisting of a frequency, a set of frequencies, an amplitude, a series of signal level transitions, a phase and a modulated digital code.

25. A system as defined in claim 17, wherein the detection unit is operable to perform a correlation operation with respect to each control signal and selecting, as the detected control signal for the particular port, the one control signal leading to a maximum correlation value.

26. A network element, comprising:
   at least one optical amplifier capable of optically amplifying an incoming traffic signal as a function of an associated energy signal;
   at least one energy source, each energy source being connected to a respective one of the at least one optical amplifier, each energy source being capable of generating the energy signal for the respective optical amplifier, each energy signal being variable in accordance with a respective control signal; and
   a connection discovery system having at least one port, the connection discovery system being a device other than the at least one optical amplifier, the system comprising: a receiver unit operable to receive an optical signal at each port in a subset of the at least one port; a detection unit operable to detect, for each port in the subset, each control signal present in the optical signal received at said port, each such control signal being a detected control signal for said port; and a controller for determining, for each port in the subset, the identity of each optical amplifier connected to said port on the basis of each detected control signal for said port and on the basis of the identity of the optical amplifier respectively associated with each detected control signal for said port.

27. A network element as defined in claim 26, further comprising a backplane for interconnecting the optical amplifiers and the connection discovery system.

28. A network element as defined in claim 26, wherein at least one optical amplifier is a rare-earth-element doped fiber amplifier.

29. A network element as defined in claim 26, wherein at least one optical amplifier is an erbium doped fiber amplifier.

30. A network element as defined in claim 26, wherein at least one optical amplifier is a Raman amplifier.

31. A network element as defined in claim 26, wherein said energy source associated with a particular one of the at least one optical amplifier includes a pump controller and wherein the associated energy signal is a pump signal.

32. A network element as defined in claim 26, wherein said energy source associated with a particular one of the at least one optical amplifier includes a source of stimulated Raman scattering (SRS).

33. A network element as defined in claim 31, wherein said pump controller includes:
   a combiner for combining the respective control signal with a respective bias signal, thereby to produce the pump signal.

34. A network element as defined in claim 33, wherein said pump controller further includes:
   a signal generator, for generating the respective control signal as a function of control information.

35. A network element as defined in claim 33, wherein said pump controller further includes:
   a signal generator, for generating the respective control signal as a function of an address of the respective optical amplifier.

36. A method of discovering the existence of connections between devices in an optical system, the devices including at least one optical amplifier, each device being connected to respective input ports of a connection discovery system, the connection discovery system being a device other than the at least one optical amplifier, each optical amplifier being capable of optically amplifying an incoming traffic signal as a function of an intensity of an associated enemy signal received from an energy source, the method comprising:
   varying the energy signal associated with each optical amplifier in accordance with a respective control signal;
   receiving an optical signal at each port of the connection discovery system;
   searching for the presence of a control signal present in the optical signal received at each port; and
   if the same control signal is present in the optical signal received at each port in a particular set of ports, concluding that the devices connected to the particular set of ports are connected to one another.

* * * * *